US007204408B2

(12) United States Patent
Cato

(10) Patent No.: US 7,204,408 B2
(45) Date of Patent: Apr. 17, 2007

(54) SYSTEM AND METHOD OF DATA ENTRY UTILIZING A SCANNING PRINTER

(75) Inventor: Robert Thomas Cato, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 49 days.

(21) Appl. No.: 11/016,153

(22) Filed: Dec. 17, 2004

(65) Prior Publication Data

US 2006/0131406 A1 Jun. 22, 2006

(51) Int. Cl.
*G06F 17/00* (2006.01)

(52) U.S. Cl. ....................................... 235/375; 235/470

(58) Field of Classification Search ................ 235/375, 235/470, 485; 347/222, 101
See application file for complete search history.

(56) References Cited

U.S. PATENT DOCUMENTS

| | | | | |
|---|---|---|---|---|
| 4,993,068 | A | 2/1991 | Piosenka et al. | |
| 5,355,411 | A | 10/1994 | MacDonald | |
| 5,444,616 | A | 8/1995 | Nair et al. | |
| 6,078,679 | A | 6/2000 | Yi et al. | |
| 6,141,438 | A | 10/2000 | Blanchester | |
| 6,283,468 | B1 * | 9/2001 | Sugiura | 271/119 |
| 6,695,427 | B2 * | 2/2004 | Murata et al. | 347/19 |
| 6,732,920 | B2 * | 5/2004 | Gatto et al. | 235/381 |
| 6,785,024 | B1 * | 8/2004 | Corby et al. | 358/474 |
| 6,832,723 | B2 * | 12/2004 | Murata et al. | 235/439 |
| 6,883,892 | B2 * | 4/2005 | Sievert et al. | 347/19 |
| 6,885,472 | B1 * | 4/2005 | Konno et al. | 358/1.15 |
| 2002/0158747 | A1 | 10/2002 | McGregor et al. | |
| 2002/0180584 | A1 | 12/2002 | McGregor et al. | |
| 2003/0047609 | A1 * | 3/2003 | Endo et al. | 235/454 |
| 2003/0069808 | A1 | 4/2003 | Cardno | |
| 2003/0236704 | A1 | 12/2003 | Antonucci | |
| 2005/0087598 | A1 * | 4/2005 | Yamanaka et al. | 235/440 |
| 2005/0093959 | A1 * | 5/2005 | Kitamura et al. | 347/222 |

OTHER PUBLICATIONS

Robert Cato, "(RSS) Loyalty Card Reaser Using a Scanning Printer" IBM Confidential Disclosure, Jan. 9, 2003, 7 pages, IBM Disclosure No. RPS8-2003-0021, Raleigh, N.C., USA.
Author Unknown, "IBM SureMark Printers: Dual-station models", IBM Brochure, Sep. 2004, 6 pages, IBM Retail Store Solutions, Raleigh, N.C. USA.
Author Unknown, "ISO Magnetic Stripe Card Standards", http://www.cyberd.co.uk/support/technotes/isocards.htm, Internet Article, date printed Dec. 10, 2004, 4 pages.

* cited by examiner

*Primary Examiner*—Thien M. Le
*Assistant Examiner*—Edwyn Labaze
(74) *Attorney, Agent, or Firm*—Mark E. McBurney; Dillon & Yudell LLP

(57) ABSTRACT

A system and method for data input into a data processing system. The data processing system includes a host computer and a multi-function terminal that includes a non-planer document-guidance track, only one scanner for retrieving data from a document and sending the data to a host computer for processing, and a one print module, located adjacent to the document-guidance track. The print module also includes at least one print head, where the position of the print head and/or platen may be altered to accommodate documents of different thickness, sizes, and rigidity to facilitate data retrieval of said scanner.

16 Claims, 4 Drawing Sheets

SYSTEM AND METHOD OF DATA ENTRY UTILIZING A SCANNING PRINTER

BACKGROUND OF THE INVENTION

1. Technical Field

The present invention relates in general to data processing systems, and in particular, to entering data into data processing systems. Still more particularly, the present invention relates to a system and method of entering data into data processing systems utilizing a scanning printer.

2. Description of the Related Art

Loyalty systems (also known as promotion or incentive systems) were developed, in part, not only to motivate the consumer to purchase a particular item, but also to promote customer loyalty to a merchant, transaction card, or service provider. Generally, such programs reward consumers for buying a particular product or conducting repeat business with the same merchant. To implement such a program, many retailers utilize the loyalty card system.

Loyalty cards are typically the size of a credit card and store data associated with the customer, such as name, address, shopping history, etc. on a magnetic strip typically located at the back of the loyalty card. As well-known to those with ordinary skill in this art, data is retrieved from a magnetic card only when the holder swipes the card through a magnetic card reader. However, magnetic card stripes are prone to deterioration due to overuse or exposure to strong magnetic fields. Therefore, there is a need for a means of retrieving information from a loyalty card without utilizing magnetic strips and magnetic card readers utilizing a scanning printer that is coupled to a point-of-sale (POS) system.

SUMMARY OF THE INVENTION

A system and method for data input into a data processing system is disclosed. The data processing system includes a host computer and a multi-function terminal that includes a non-planer document-guidance track, only one scanner for retrieving data from a document and sending the data to a host computer for processing, and a print module, located adjacent to the document-guidance track. The print module also includes at least one print head, where the position of the print head and/or platen may be altered to accommodate documents of different thickness, sizes, and rigidity to facilitate data retrieval by the scanner.

The above-mentioned features, as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects and advantages thereof, will be best understood by reference to the following detailed description of an illustrative embodiment when read in conjunction with the accompanying drawings, wherein:

DETAILED DESCRIPTION OF A PREFERRED EMBODIMENT

Figure 1:
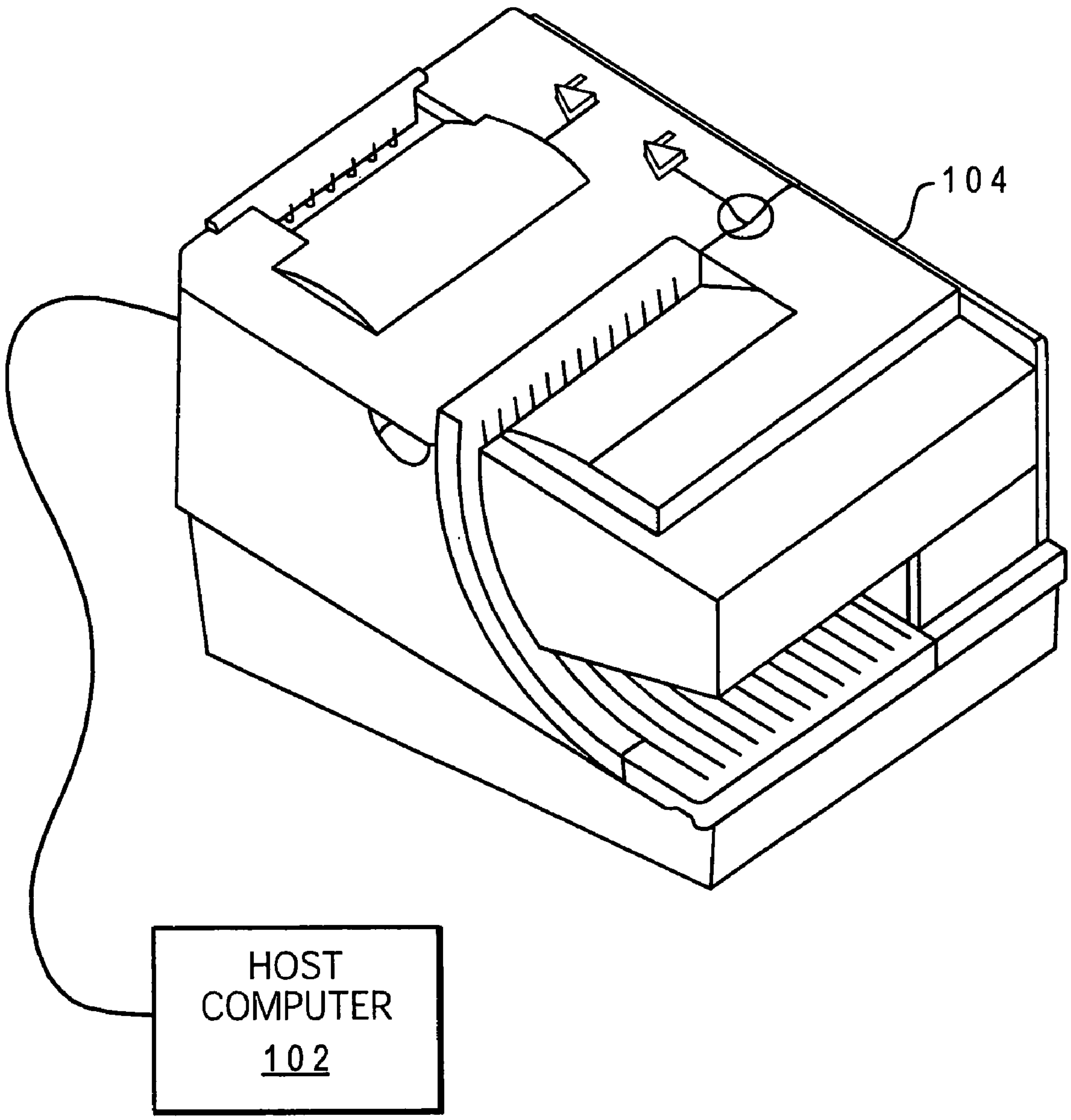
FIG. 1 is a block diagram of a data processing system in which the present invention may be implemented in accordance with a preferred embodiment.

Referring now to the figures, and in particular, referring to FIG. 1, there is depicted a depiction of a data processing system 100 in which a preferred embodiment of the present invention may be implemented. An example is the IBM SurePOS Series, which is a product of IBM Corporation located in Armonk, N.Y. As depicted, data processing system 100 is preferably implanted as a point-of-sale (POS) system that includes a host computer 102 coupled to a multi-function terminal 104. Multi-function terminal 104, discussed herein in more detail, scans a variety of media to retrieve data and sends the data to host computer 102 for processing. Also, multi-function terminal 104 may be utilized as a printer to output the results of host computer 102 processing.

Figure 2:
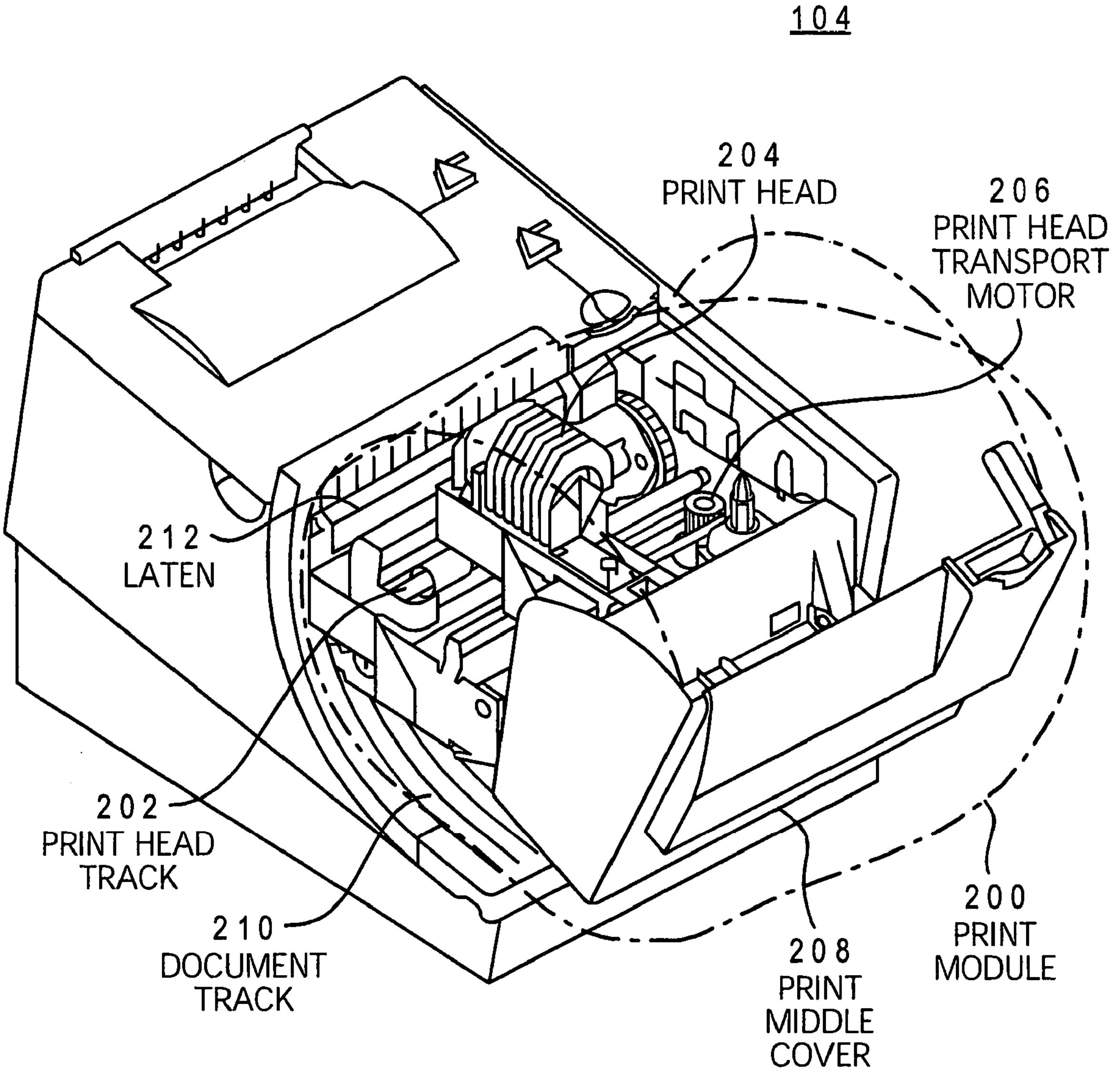
FIG. 2 is a more detailed diagram of a multi-function terminal in which the present invention may be implemented in accordance with a preferred embodiment.

With reference now to FIG. 2, there is illustrated a more detailed illustration of multi-function terminal 104 in which a preferred embodiment of the present invention may be implemented. An example of multi-function terminal 104 is an IBM SureMark Series. As depicted, multi-function terminal 104 includes a print module 200 and a non-planer document track 210 (with an optimal radial bend of at least 81.5 mm), adjacent to print module 200. Print module 200 includes a print module cover 208 that protects the interior of print module 200 from dust and damage. Print module 200 also includes a print head track 202, print head 204, and print head transport motor 206. Print head transport motor 206, controlled by host computer 102, preferably moves print head 204 along print head track 202 during the printing on documents such as checks or receipts. While the present invention may be implemented with more than one print head, the advantages of a single print head include: more reliable operation and less costly implementation.

As implemented in the present invention, multi-function terminal 104 may alter the position of print head 204 to accommodate documents of different thickness, sizes, and rigidity. For example, according to a preferred embodiment, if host computer 102 issues a command for multi-function terminal 104 to scan a document of high thickness and rigidity (e.g., a credit card-sized loyalty card), print head motor 206 moves print head 204 (e.g., impact print head) to one side of print track 202 to allow the document to pass freely through document track 210 without interference from print head 204.

While in a preferred embodiment of the present invention, print head 204, as discussed, may preferably be implemented as an impact print head. However, those well-skilled in the art may appreciate that print head 204 may be other types of print heads well-known in the art, such as thermal or ink jet print heads. Also, those well-skilled in the art may also appreciate that the position of print head 204 and/or platen 212 may also be moved away or closer with respect to document track 210 to accommodate the various types of documents, instead of being limited to the side-to-side motion of print head transport motor 206 along print head track 202.

Figure 3:
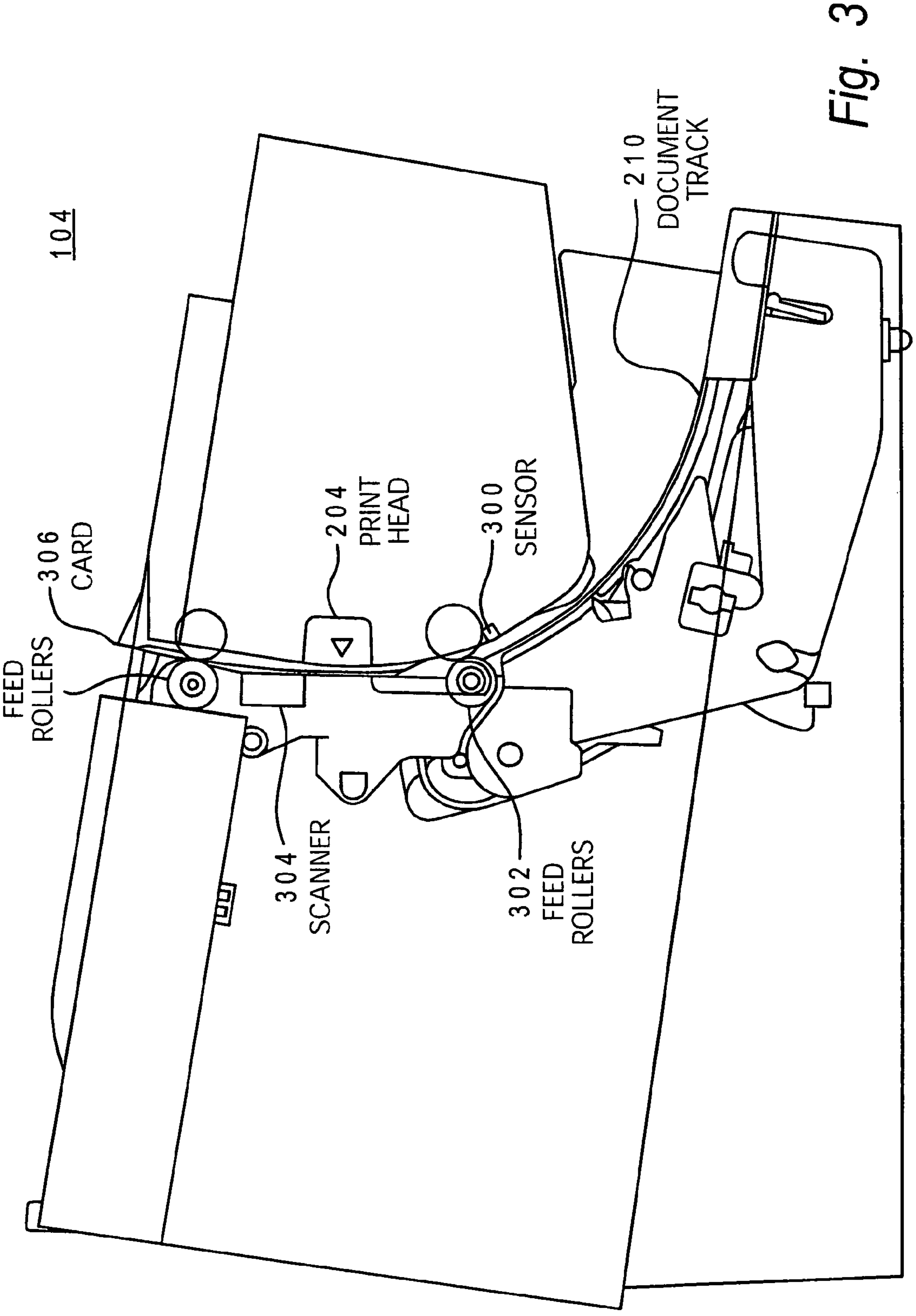
FIG. 3 is a engineering cross-section diagram of a multi-function terminal in which the present invention may be implemented in accordance with a preferred embodiment.

Referring now to FIG. 3, there is depicted an engineering cross-section of multi-function terminal 104 in which a preferred embodiment of the present invention may be implemented. As illustrated, multi-function terminal 104 also includes a sensor 300 embedded in document track 210. Feed rollers 302 are driving card 306 through document track 210 to facilitate data retrieval by scanner 304. Those skilled in the art will appreciate that card 306 may be a document of varying size, thickness, and rigidity. Card 306 is preferably implemented in a preferred embodiment of the present invention as a loyalty card that conforms to the standard credit-card size as dictated by the ANSI/ISO 7810 standard. Cards conforming to the ANSI/ISO 7810 standard have the physical dimensions of 85.725 mm×55.245 mm×0.762 mm.

Figure 4:
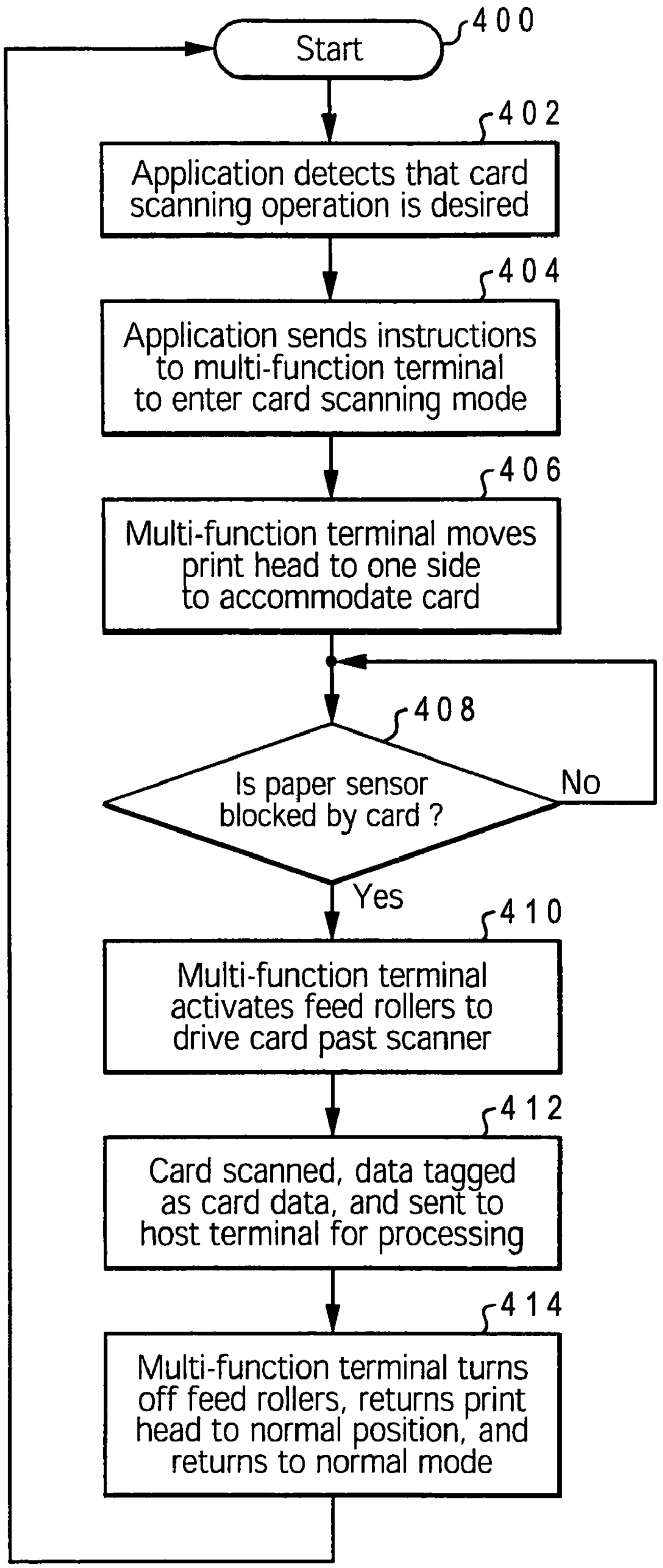
FIG. 4 is a high-level logical flowchart demonstrating an exemplary scanning procedure in accordance with a preferred embodiment of the present invention.

As discussed with more detail in conjunction with FIG. 4, a user of data processing system 100 indicates to host computer 102 that a card scanning operation is desired. Then, host computer 102 sends a command to multi-function terminal 104 to enter a card scanning operation mode. Multi-function terminal 104 moves print head 204 to one side of print head track 202. Multi-function terminal 104 waits for a signal from sensor 300 to determine whether sensor 300 is blocked by the document to be scanned. In a preferred embodiment of the present invention, the document may be a rigid loyalty card that conforms to ANSI/ISO 7810. However, those skilled in this art will appreciate that the document may be a check, receipt, card, or any other document of varying thickness and rigidity. When sensor 300 detects the presence of card 306, multi-function terminal 104 activates feed rollers 302 to drive card 306 past a scanner 304 to facilitate the scanning of the document for data retrieval. By altering the position of print head 204, documents of different thickness, sizes, and rigidity may be scanned along the single document track 210.

With reference to FIG. 4, there is illustrated a high-level logical flowchart of an exemplary card scanning process of a preferred embodiment of the present invention. As depicted, the process beings at step 400. At the start of the process, multi-function terminal 104 is in a normal operation mode, with print head 204 in a normal (e.g., centered) operating position. The process then proceeds to step 402, which illustrates an application stored in memory of host computer 102 detecting that a card scanning operation, or any document scanning operation that requires alteration of the position of print head 204, is desired by a user of data processing system 100. The process then continues to step 404, which depicts the application sending instructions to multi-function terminal 104 to enter into the card scanning operation. Then, the process proceeds to step 406, which illustrates multi-function terminal 104 driving print head motor 206 to move print head 204 to one side of print head track 202 to accommodate the passing of a card through document track 210. The process then continues to step 408, which depicts multi-function terminal 104 determining whether or not sensor 300 is blocked by the document to be scanned (e.g., card 306). If multi-function terminal 104 determines that sensor 300 is not blocked, the process iterates back to step 408.

However, if multi-function terminal 104 determines that sensor 300 is blocked by a document to be scanned, the process continues to step 410, which illustrates multi-function terminal 104 activating feed rollers 302 to drive the document past scanner 304. The process then proceeds to step 412, which depicts scanner 304 scanning the document, multi-function terminal 104 tagging the scanned data as recently scanned data, and sending the tagged data to host computer 102 for processing. After the scanning of the document data, the process continues to step 414, which illustrates multi-function terminal 104 turning off feed rollers 302, returning print head 204 to the normal operating position before the card scanning operation was initiated by host computer 102, and returning to a normal operation mode. The process then returns to step 400 and proceeds in an iterative fashion.

As has been described, a system and method for data input into a data processing system is disclosed. The data processing system includes a host computer and a multi-function terminal that includes a document-guidance track, a single scanner for retrieving data from a document and sending the data to a host computer for processing, and a print module, located adjacent to the document-guidance track. The print module also includes at least one print head, where the position of the print head or platen may be altered to accommodate documents of different thickness, sizes, and rigidity to facilitate data retrieval of said scanner. Also, the system and method of the present invention allows documents of different thickness, sizes, and rigidity to be scanned via a single document-guidance track.

It should be understood that at least some aspects of the present invention may alternatively be implemented in a program product. Program defining functions on the present invention can be delivered to a data storage system or a computer system via a variety of signal-bearing media, which include, without limitation, non-writable storage media (e.g., CD-ROM), writable storage media (e.g., a floppy diskette, hard disk drive, read/write CD-ROM, optical media), and communication media, such as computer and telephone networks including Ethernet and/or Universal Serial Bus (USB). It should be understood, therefore in such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the invention has been particularly shown and described with reference to a preferred embodiment, it will be understood by those skilled in the art that various changes in form and detail may be made therein without departing from the spirit and scope of the invention.

What is claimed is:

1. A system for data input into a data processing system, said system comprising:

a host computer; and a multi-function terminal, coupled to said host computer, wherein said multi-function terminal further includes:

a non-planar document-guidance track;

only one scanner for retrieving data from a document and sending said data to said host computer for processing; and a print module, located adjacent to said document-guidance track, wherein said print module further includes:

a print head track situated orthogonally to said non-planar document-guidance track; and at least one print head coupled to said print head track, wherein a position of said at least one print head can be altered, by moving said at least one print head to one side of said print head track, to accommodate documents of different thickness, sizes, and rigidity to facilitate data retrieval of said scanner, wherein said at least one print head can be situated in a first position during a normal scanning operation and a second position during a card scanning operation, wherein responsive to a request to scan data utilizing said card scanning operation, said at least one print head of said scanning printer is capable of moving, relative to said non-planar document guidance track, from said first position to said second position.

2. The system according to claim 1, wherein said non-planer document guidance track has a radial bend of at least 81.5 mm.

3. The system according to claim 1, wherein said print module further comprises:

a platen for guiding said document while said document is being printed by said at least one print head, wherein a position of said platen may be altered to accommodate documents of different thickness, sizes, and rigidity to facilitate data retrieval of said scanner.

4. The system according to claim 3, wherein said position of said print head is altered by adjusting said position of said platen relative to said position of said at least one print head.

5. The system according to claim 1, wherein said documents are a rigid card and a flexible document.

6. The system according to claim 5, wherein said rigid card is a credit-card sized card.

7. A multi-function terminal, comprising:

a non-planar document-guidance track;

only one scanner for retrieving data from a document and sending said data to said host computer for processing; and a print module, located adjacent to said document-guidance track, wherein said print module further includes:

a print head track situated orthogonally to said non-planar document-guidance track; and at least one print head coupled to said print head track, wherein a position of said at least one print head can be altered, by moving said at least one print head to one side of said print head track, to accommodate documents of different thickness, sizes, and rigidity to facilitate data retrieval of said scanner, wherein said at least one print head can be situated in a first position during a normal scanning operation and a second position during a card scanning operation, wherein responsive to a request to scan data utilizing said card scanning operation, said at least one print head of said scanning printer is capable of moving, relative to said non-planar document guidance track, from said first position to said second position.

8. The multi-function terminal according to claim 7, wherein said document-guidance track has a radial bend of at least 81.5 mm.

9. The multi-function terminal according to claim 7, further including:

a platen for guiding said document while said document is being printed by said at least one print head, wherein a position of said platen may be altered to accommodate documents of different thickness, sizes, and rigidity to facilitate data retrieval of said only one scanner.

10. The multi-function terminal according to claim 9, wherein said position of said print head is altered by adjusting said position of said platen relative to said position of said at least one print head.

11. The multi-function terminal according to claim 7, wherein said documents are a rigid card and a flexible document.

12. The multi-function terminal according to claim 11, wherein said rigid card is a credit-card sized card.

13. A method for data input into a data processing system, said method comprising:

in response to detecting a request to scan data from a document with a scanning printer into a data processing system, altering a position of at least one print head coupled to a print head track of said scanning printer, by moving said at least one print head to one side of said print head track situated orthogonally to a non-planar document-guidance track, to accommodate documents of different thickness, sizes, and rigidity to facilitate data retrieval, wherein in response to a request to scan data utilizing a card scanning operation, moving said at least one print head of said scanning printer, relative to said non-planer document guidance track, from a first position to a second position, wherein said at least one print head can be situated in said first position during a normal scanning operating and said second position during a card scanning operation.

14. The method of claim 13, further including:

determining whether a document sensor of said scanning printer is blocked; and in response to said determining, pulling said document through said scanning printer.

15. The method of claim 13, further including:

guiding said document with a platen while said document is being printed by said at least one print head, wherein a position of said platen may be altered to accommodate documents of different thickness, sizes, and rigidity to facilitate data retrieval of said scanner.

16. The method of claim 15, further including:

altering said position of said at least one print head by adjusting said position of said platen relative to said at least one print head.

* * * * *